(12) United States Patent
Tervo et al.

(10) Patent No.: US 12,452,802 B2
(45) Date of Patent: Oct. 21, 2025

(54) MAXIMUM POWER REDUCTION BASED ON TX AND RX IMPAIRMENTS

(71) Applicant: NOKIA TECHNOLOGIES OY, Espoo (FI)

(72) Inventors: Oskari Tervo, Oulu (FI); Kari Pajukoski, Oulu (FI); Esa Tiirola, Oulu (FI)

(73) Assignee: Nokia Technologies Oy, Espoo (FI)

( * ) Notice: Subject to any disclaimer, the term of this patent is extended or adjusted under 35 U.S.C. 154(b) by 408 days.

(21) Appl. No.: 17/997,920

(22) PCT Filed: Apr. 29, 2021

(86) PCT No.: PCT/EP2021/061280
§ 371 (c)(1),
(2) Date: Nov. 4, 2022

(87) PCT Pub. No.: WO2021/228568
PCT Pub. Date: Nov. 18, 2021

(65) Prior Publication Data
US 2023/0156630 A1 May 18, 2023

Related U.S. Application Data

(60) Provisional application No. 63/025,847, filed on May 15, 2020.

(51) Int. Cl.
*H04W 52/36* (2009.01)
*H04W 52/14* (2009.01)
*H04W 52/26* (2009.01)

(52) U.S. Cl.
CPC ....... *H04W 52/367* (2013.01); *H04W 52/146* (2013.01); *H04W 52/265* (2013.01)

(58) Field of Classification Search
None
See application file for complete search history.

(56) References Cited

U.S. PATENT DOCUMENTS 10,257,792 B2 * 4/2019 Fodor ............ H04W 52/14
2014/0011494 A1 * 1/2014 Haim ............ H04W 52/146
455/422.1

(Continued)

FOREIGN PATENT DOCUMENTS

WO 2008130693 A2 10/2008

OTHER PUBLICATIONS

International Search Report and Written Opinion for International Application No. PCT/EP2021/061280, mailed on Jul. 22, 2021, 13 pages.

*Primary Examiner* — Saumit Shah
(74) *Attorney, Agent, or Firm* — Barta Jones, PLLC (57) ABSTRACT

A method, apparatus, and a computer-readable storage medium are provided for transmission power handling with RF impairments. A method, apparatus, and a computer-readable storage medium are provided for adjusting maximum power reduction (MPR) values based on transmitter and receiver impairments. transmission power handling with RF impairments. In an example implementation, the method may include determining, by a user equipment, at least a first maximum power reduction (MPR) value for a radio link, the determining based at least on one or more receiver impairments associated with a receiver of the radio link; adjusting, by the user equipment, a transmit power and a quality of a signal being transmitted on the radio link based at least on the first MPR value; and transmitting, by the user equipment, the signal using the adjusted transmit power. In another example implementation, the method may include transmitting, by a gNB, a first MPR value or a parameter indicative of the first MPR value of a radio link to a user (Continued)

equipment; and receiving, by the gNB, a signal from the user equipment, wherein a transmit power and a quality of the signal is adjusted at the user equipment based at least on the first MPR value.

14 Claims, 8 Drawing Sheets

(56) References Cited

U.S. PATENT DOCUMENTS

| | | | |
|---|---|---|---|
| 2015/0181517 A1 | 6/2015 | Lee et al. | |
| 2018/0262997 A1* | 9/2018 | Frank | H04W 72/21 |
| 2019/0261284 A1* | 8/2019 | Moroga | H04W 52/36 |
| 2021/0099960 A1* | 4/2021 | Haim | H04W 52/32 |

* cited by examiner

| OFDM 64-QAM | BO | SNR+BO for 10% BLER (960 kHz) | SNR+BO for 10% BLER (480 kHz) |
|---|---|---|---|
| No Phase Noise | 10 | 4.5 | 4.4 |
|  | 7 | 1.9 | 1.7 |
|  | 6 | 1.4 | 1.3 |
|  | 5 | 1.2 | 1.2 |
|  | 4 | 2 | 1.8 |
| With Phase Noise | 10 | 5.2 | 5.8 |
|  | 7 | 2.8 | 3.4 |
|  | 6 | 2.4 | 3.3 |
|  | 5 | 2.6 | 3.9 |
|  | 4 | 5.4 |  |

BO = Total MPR

MAXIMUM POWER REDUCTION BASED ON TX AND RX IMPAIRMENTS

CROSS-REFERENCE TO RELATED APPLICATIONS

This application is a national stage entry of International Application No. PCT/EP2021/061280, filed Apr. 29, 2021, entitled "MAXIMUM POWER REDUCTION BASED ON TX AND RX IMPAIRMENTS" which claims the benefit of priority of U.S. Provisional Application No. 63/025,847, filed May 15, 2020, both of which are hereby incorporated by reference in their entireties.

TECHNICAL FIELD

This description relates to wireless communications, and in particular, maximum power reduction.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

Various example implementations are described and/or illustrated. The details of one or more examples of implementations are set forth in the accompanying drawings and the description below. Other features will be apparent from the description and drawings, and from the claims.

A method, apparatus, and a computer-readable storage medium are provided for adjusting maximum power reduction (MPR) values based on transmitter and receiver impairments. transmission power handling with RF impairments. In an example implementation, the method may include determining, by a user equipment, at least a first maximum power reduction (MPR) value for a radio link, the determining based at least on one or more receiver impairments associated with a receiver of the radio link; adjusting, by the user equipment, a transmit power and a quality of a signal being transmitted on the radio link based at least on the first MPR value; and transmitting, by the user equipment, the signal using the adjusted transmit power.

In another example implementation, the method may include transmitting, by a gNB, a first MPR value or a parameter indicative of the first MPR value of a radio link to a user equipment; and receiving, by the gNB, a signal from the user equipment, wherein a transmit power and a quality of the signal is adjusted at the user equipment based at least on the first MPR value.

DETAILED DESCRIPTION

Figure 1:
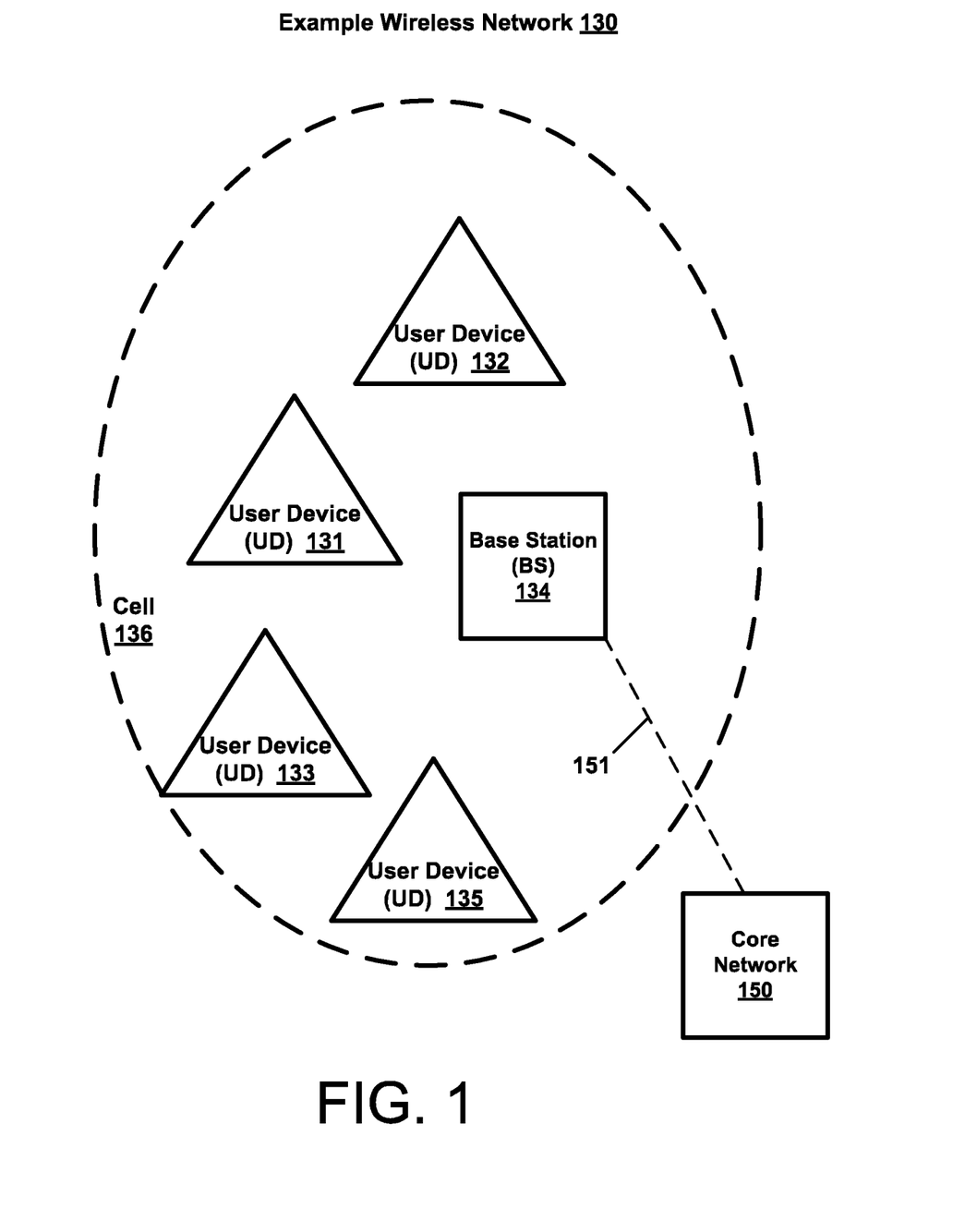
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next-generation Node B (gNB) or a network node. At least part of the functionalities of an access point (AP), base station (BS), (e)Node B (eNB), or gNB may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. In some implementations, the base station may be the functionality of a relay node facilitating access (e.g., child) link connections, e.g., communication between the relay node and UEs. For example, base station may be a distributed unit part of the integrated access and backhaul node. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. In some implementations, the user device may be the functionality of the relay node facilitating backhaul connection, e.g., communication between the donor (e.g., parent) node. For example, user device may be a mobile termination part of the integrated access and backhaul node. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

For carrier frequencies greater than 52.6 GHz (>52.6 GHz), radio frequency (RF) impairments such as phase noise and power amplifier non-linearity significantly affect network performance. Phase noise may be generally defined as noise arising from short term phase fluctuations in a signal (e.g., due to oscillators). The fluctuations may manifest themselves as sidebands which may appear as noise spectrum spreading out either side of the signal. In some scenarios, the phase noise may be partly compensated using phase tracking reference signals to estimate the phase noise in the receiver. However, the impact of phase noise on the performance and phase noise estimation accuracy depend on subcarrier spacing. The smaller the subcarrier spacing between the subcarriers, the more severe is the inter-carrier interference caused by phase noise, and the more difficult it is to compensate. The compensation ability also depends on the waveform, e.g., whether the waveform is a cyclic prefix-orthogonal frequency division multiplexing (CP-OFDM) waveform or a discrete Fourier transform-spread-OFDM (DFT-s-OFDM) waveform as the DFT-s-OFDM waveform is able to compensate the phase noise better than the OFDM waveform.

Power Backoff (BO) for an amplifier can be generally defined as a transmit power level below a saturation point at which the amplifier may continue to operate in a linear mode even if there is a slight increase in the input power level. In general, power amplifiers operate close to the saturation point where efficiency is at a maximum level. However, when an amplifier is operating at the saturation point, a small increase in input power can push the amplifier from the linear mode to a non-linear mode (or saturated mode). Therefore, to ensure the amplifier operates in the linear region, the transmit power level may be lowered (e.g., reduced, backed off, etc.) from the point of maximum efficiency (e.g., lowered from the saturation point). The value of this power level reduction may be defined as BO (or BO value). This means that the higher the power backoff, the smaller is the actual transmit power and coverage. The power backoff is used because the input power level is not constant and varies quite significantly. This variation may be characterized by peak-to-average power ratio (PAPR). The higher the PAPR, the more variations in input power levels, which means that more power backoff is required to ensure operation of the amplifier in the linear region.

In addition, as the PAPR may vary based on a modulation scheme, lower-order modulations with lower PAPR may tolerate smaller power backoff. In 3GPP Specifications, a maximum power reduction (MPR) value for each modulation is defined which lists the highest allowed reduction in maximum power level (e.g., power backoff) which a UE can use for a given modulation. In other words, the configuration of the MPR value allows the UE, in some configurations, to lower its maximum output power to meet the general requirements on signal quality and out-of-band emissions. In other words, the MPR value is an allowance and the UE is not required to used it. The MPR value may also depend on the waveform, e.g., OFDM waveform has larger PAPR than DFT-s-OFDM waveform, and therefore requires larger MPR value.

In addition, in some scenarios, the gNB may inform the UE of the possibility of further lowering its maximum power by signaling an additional MPR (A-MPR). The need for an A-MPR occurs with certain band combinations, channel bandwidths, and transmission bandwidths for which the UE must meet additional (more stringent) requirements for spectrum emission mask and spurious emissions. Based on existing solutions, MPR and A-MPR are determined based on the characteristics of the transmitted signal. The problem of this approach is that it does not take into account the receiver operation due to impairments at the receiver.

In addition, the impairments described above (e.g., phase noise and power amplifier non-linearity) are typically considered separately. However, in deployment scenarios with carrier frequencies >52.6 GHz, and especially when both the above described imperfections are simultaneously considered, there are several drawbacks. For instance, the coverage provided by carrier frequencies >52.6 GHz is very limited and therefore should be maximized. This may require using MPR values as low as possible to obtain maximum transmit power and coverage. However, the lower the MPR, the more severe are the impact of RF impairments such as phase noise and/or power amplifier non-linearity. Further, when operating with different numerologies (e.g., subcarrier spacings, etc.), the use of the same MPR value for every numerology is inefficient because the impact of RF impairments is different for different subcarrier spacings when both phase noise and PA non-linearity are considered. In other words, using a fixed MPR value, the smaller subcarrier spacings as defined in 3GPP Specification (e.g., TS 38.101-1 or TS 38.101-2) would not result in the best performance and/or may even ruin the performance for smaller subcarrier spacings. For example, for power class 3 (handheld UE), the MPR values are defined in the 3GPP Specification, Section 6.2.2.3-2. Therefore, there is a desire and/or need to configure MPR values by taking into the consideration the subcarrier spacings.

The present disclosure proposes a receiver impairment-maximum power reduction (RI-MPR) value which may be determined taking into consideration both transmitter (TX) and receiver (RX) impairments and may be dependent on subcarrier spacing to maximize a link budget for a link and provide optimized performance when operating with multiple numerologies and different RF impairment conditions. In an example implementation, the present disclosure describes a method which may include a user equipment determining at least a RI-MPR value for a radio link. The determination may be based at least on one or more receiver impairments associated with a receiver of the radio link. In an example implementation, the receiver impairment may include phase noise conditions at the RX. The example method may further include the user equipment adjusting a transmit power and a quality of a signal being transmitted on the radio link based at least on the RI-MPR value and transmitting the signal using the adjusted transmit power.

Figure 2:
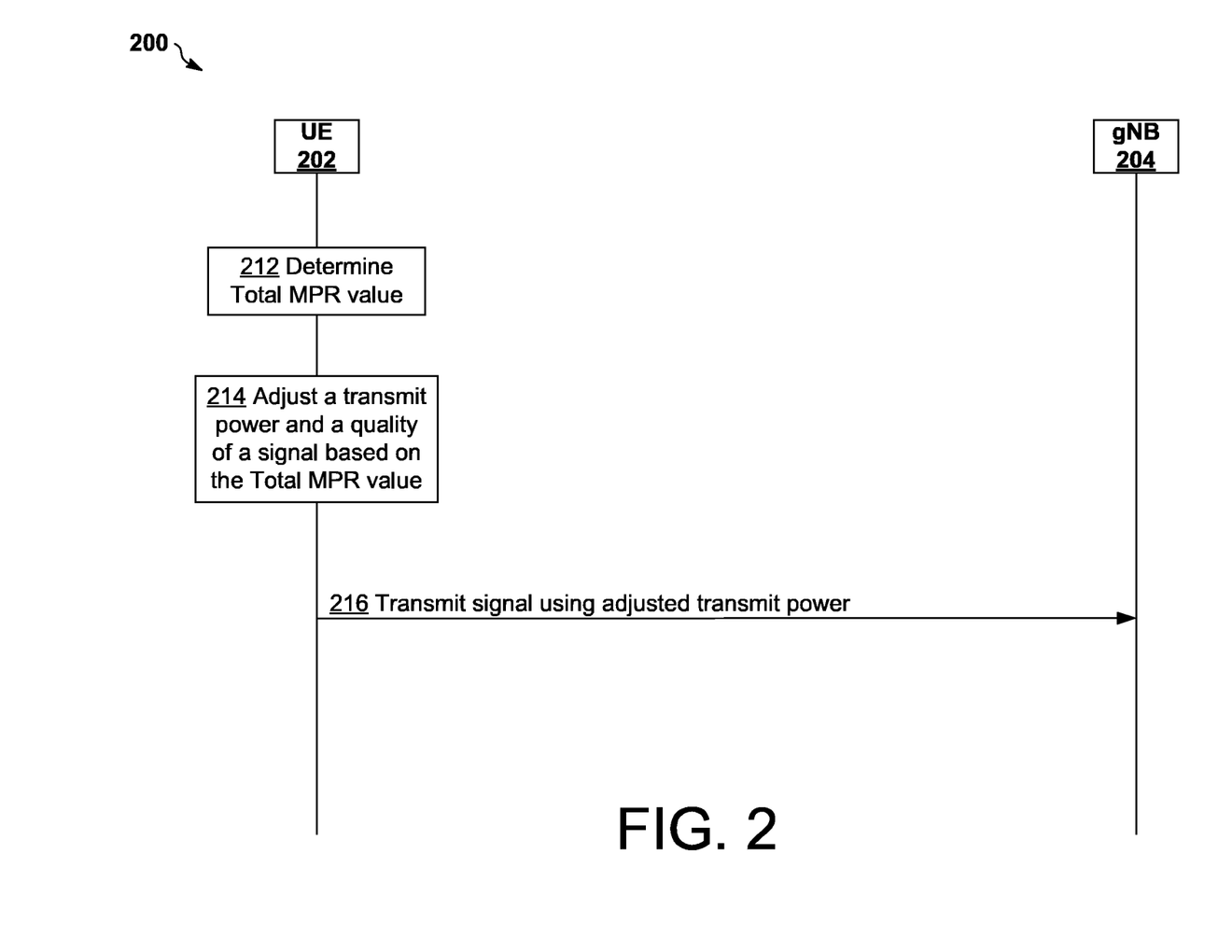
FIG. 2 illustrates a mechanism for adjusting maximum power reduction (MPR) values based on transmitter and receiver impairments, according to an example implementation.

FIG. 2 illustrates a mechanism for adjusting maximum power reduction (MPR) values based on transmitter and receiver impairments, according to an example implementation.

In an example implementation, FIG. 2 illustrates a UE, e.g., UE 202, in communication with a gNB, e.g., gNB 204, via a radio link.

At 212, a UE, e.g., UE 202, may determine a Total MPR (e.g., Total MPR value, MPR budget, etc.) for a radio link to communicate with a gNB, e.g., gNB 204. The Total MPR may allow the UE to lower its maximum output power to meet the general requirements of signal quality and out-of-band emissions. In some implementations, for example, the total MPR value may be shown as below:

Total MPR=RI-MPR+A-MPR+MPR

In some implementations, for example, RI-MPR may represent receiver impairment-MPR at the receiver (e.g., gNB) for uplink transmissions from the UE to the gNB, which may be determined based on (or taking into account) RF impairments at the receiver (e.g., gNB 204). In an example implementation, the impairments at the receiver may include one or more of: phase noise conditions at the receiver, phase noise mitigation conditions at the receiver (e.g., receiver's ability to compensate for the phase noise), carrier frequency offset conditions at the receiver (e.g., carrier frequency offset may arise due to frequency mismatch between Tx and Rx oscillators or Doppler effect which may arise if TX and/or RX are moving, etc.), inter-carrier interference conditions at the receiver (e.g., inter-carrier interference may arise if subcarriers are not orthogonal anymore and the subcarrier leaks to neighboring subcarriers and thus interfering it), timing error conditions at the receiver (e.g., timing error due to synchronization so that the receiver's sampling time differs from the correct sampling time), and/or channel estimation conditions (e.g., how well the receiver able to estimate the channel).

In addition to the RI-MPR, the gNB may inform the UE of the possibility of further lowering its maximum power by signaling an additional MPR (A-MPR). The need for A-MPR may occur with certain frequency band combinations, channel bandwidths, and transmission bandwidths for which the UE may have to meet additional (e.g., more stringent) requirements for spectrum emission mask and spurious emissions. Although the RI-MPR may be determined based on the impairments at the receiver (e.g., gNB 204), the A-MPR may be determined based on the characteristics of the transmission signal, for example, at the transmitter (e.g., UE 202). Further, the MPR may be determined based on 3GPP Specification TS 38.101. In some implementations, for example, the Total MPR may be determined based on RI-MPR and MPR values (e.g., without the A-MPR value).

At 214, the UE may adjust a transmit power and a quality of the signal based at least on the Total MPR. In some implementations, for example, the UE may adjust (e.g., reduce or increase) a transmit power of the signal being transmitted from the UE to the gNB by the Total MPR value.

At 216, the UE may transmit the signal using the adjusted transmit power. In some implementations, for example, the UE may transmit the signal from the UE using the adjusted transmit power as the transmit power. The transmission of the signal using the adjusted transmit power reduces (or minimizes) the impact due to transmitter and receiver impairments regardless of the signal format used at the UE.

Figure 3:
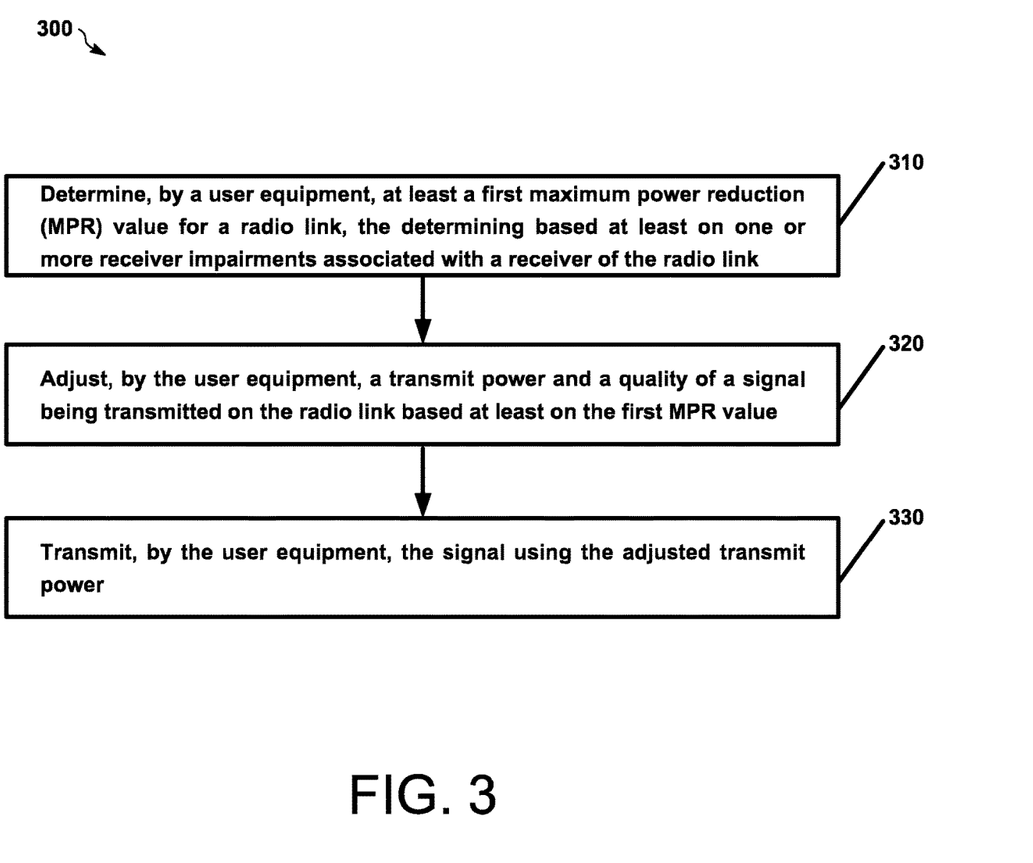
FIG. 3 is a flow chart illustrating adjusting maximum power reduction (MPR) values based on transmitter and receiver impairments, according to an example implementation.

FIG. 3 is a flow chart 300 illustrating adjusting maximum power reduction (MPR) values based on transmitter and receiver impairments, according to an example implementation.

At block 310, in an example implementation, a UE, e.g., UE 202, may determine at least a first maximum power reduction (MPR) value for a radio link. In some implementations, for example, the UE may determine a first MPR value, e.g., RI-MPR value. As described in the present disclosure, the RI-MPR value may be determined based on one or more receiver impairments associated with a receiver of a radio link between the UE and a gNB, e.g., gNB 204. In an example implementation, the receiver impairments may include one or more of (or at least one of) phase noise conditions at the receiver, phase noise mitigation conditions at the receiver, carrier frequency offset conditions at the receiver, inter-carrier interference conditions at the receiver, and/or timing error conditions at the receiver.

Figure 5A:
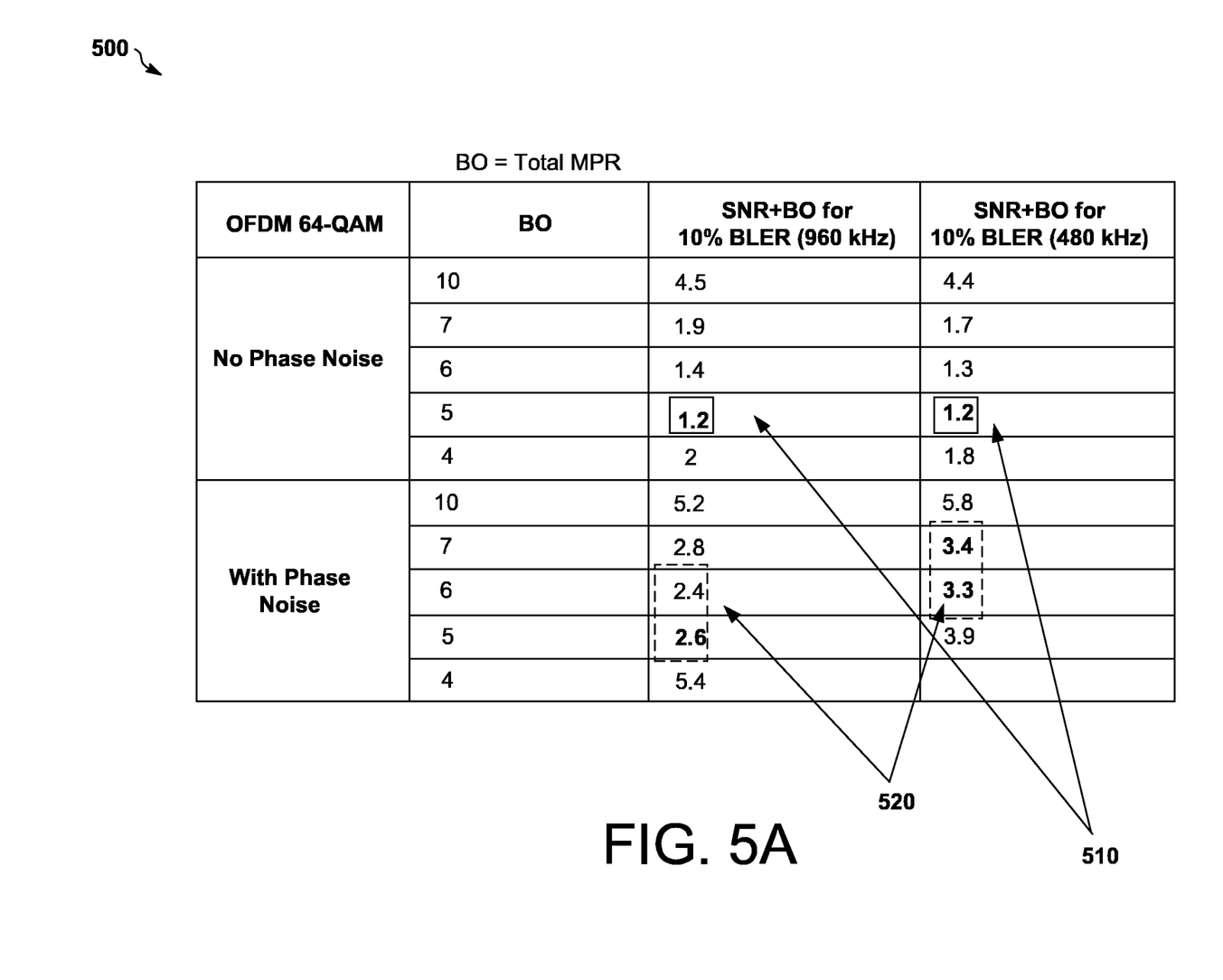
FIG. 5A illustrates link-level performance of OFDM when both phase noise and different power back-off values are included for 64-QAM, according to an additional example implementation.
Figure 5B:
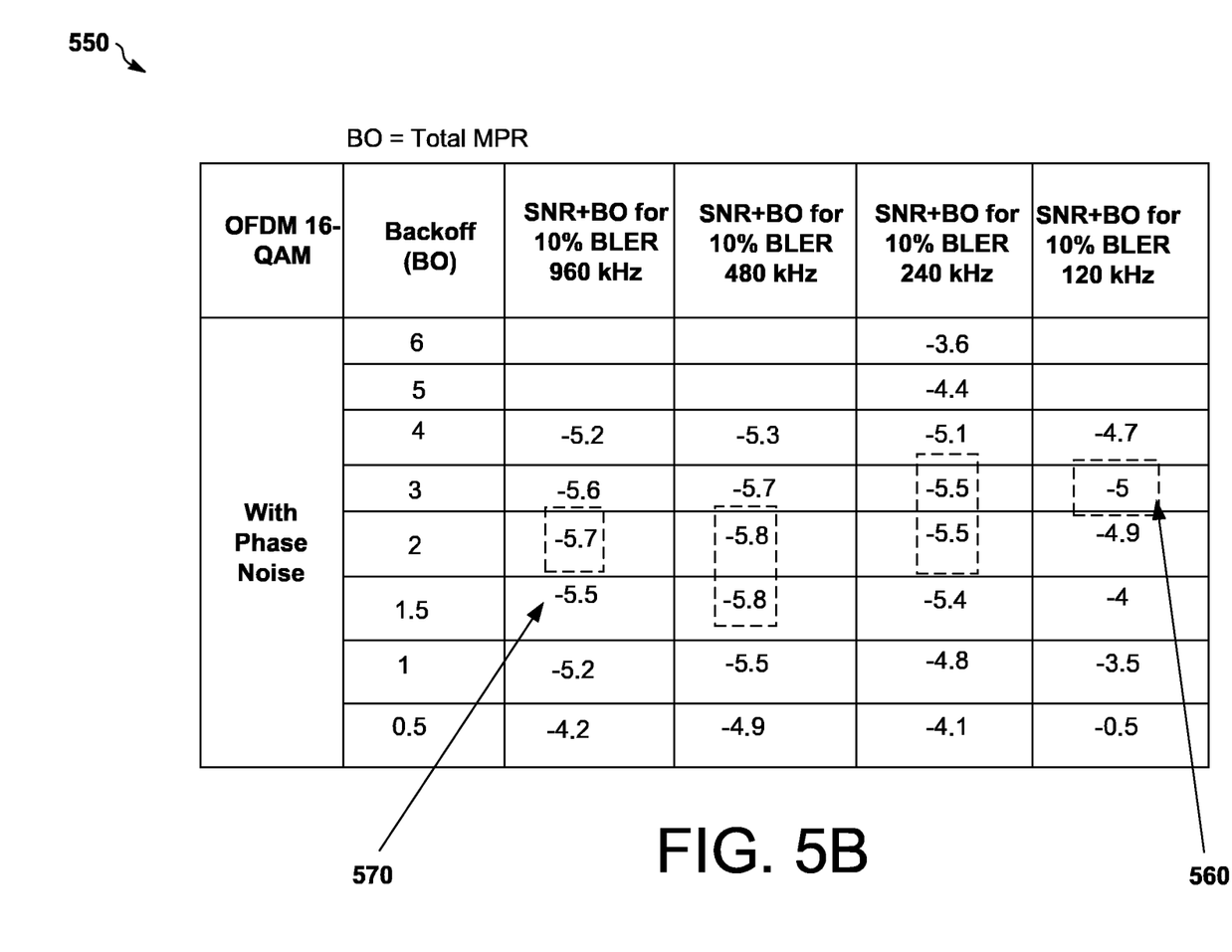
FIG. 5B illustrates link-level performance of OFDM when both phase noise and different power back-off values are included for 16-QAM, according to an example implementation.
Figure 6:
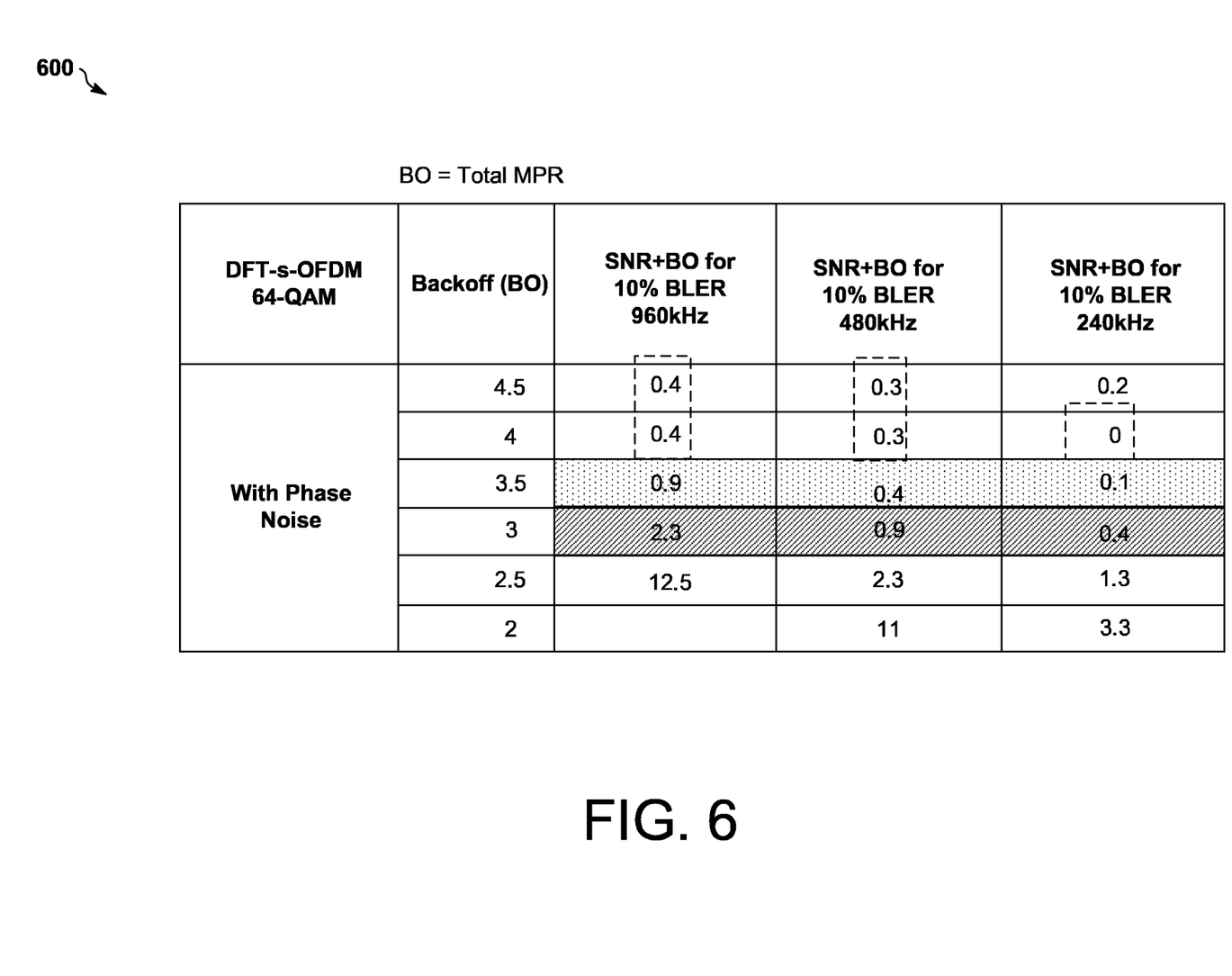
FIG. 6 illustrates link-level performance for DFT-s-OFDM with phase noise and different power back-off values using 64-QAM, according to another additional example implementation.

In some implementations, for example, the RI-MPR value may be determined based on one or more (at least one) transmission parameters, e.g., subcarrier spacing configuration, an allocation bandwidth, a waveform, etc. as the transmission parameters impact RI-MPR values, further described in detail in reference to FIGS. 5A, 5B, and 6. In an example implementation, the waveform may be a cyclic prefix-orthogonal frequency division multiplexing (CP-OFDM) waveform or a discrete Fourier transform-spread-OFDM (DFT-s-OFDM) waveform with positive or negative RI-MPR values. For example, negative RI-MPR values may be achieved when determining the reference RI-MPR according to a low subcarrier spacing value (such as 120 kHz) for CP-OFDM. In this case operation with a high SCS (such as 960 kHz SCS) could be supported with negative RI-MPR values. On the other hand, if the reference RI-MPR is determined according to a high SCS value (such as 960 kHz SCS) for CP-OFDM, then RI-MPR value for a low SCS (such as 120 kHz SCS) would be positive.

The RI-MPR values may be determined in several ways. In an example implementation, the RI-MPR value may be pre-defined at the user equipment. In an additional example implementation, the UE may receive the RI-MPR value from a gNB via higher layer signaling. In an additional example implementation, the UE may receive a parameter indicative of the RI-MPR value from a gNB via higher layer signaling and the UE may then determine the RI-MPR value based at least on the received parameter. In an additional example implementation, the UE may determine the RI-MPR value based on a signal or a signal combination to be transmitted. For example, the RI-MPR values for some signals (e.g., physical uplink control channel (PUCCH), physical uplink shared channel, etc.) may be determined separately. In an additional example implementation, the UE may determine the RI-MPR value based at least on a predefined table captured in 3GPP Specifications. In other words, the table in the Specification may be provided separately for each subcarrier spacing value (as the UE has knowledge of the subcarrier spacing of the signal to be transmitted). For example, when transmitting a physical random access channel (PRACH), the UE may receive PRACH config, including subcarrier spacing configuration from the system information.

At block 320, the UE may adjust a transmit power and a quality of a signal being transmitted on the radio link based at least on the first MPR value. In some implementations, for example, the UE may adjust a transmit power of the signal being transmitted based at least on the RI-MPR value. In some implementations, for example, the quality may be related to error vector magnitude (EVM), outband emissions, inband emissions, etc. In other words, the quality may refer to how much the signal is already interfered in the transmitter (when it goes to the channel). For example, when the MPR is decreased (e.g., increased transmit power), the power amplifier may cause more non-linear interference to the amplified and transmitted signal and when this is converted back to the original signal, it may not be the same ideal signal anymore. In addition, if the TX power is increased, EVM and emissions may also increase.

In an additional example implementation, the UE may adjust the transmit power of the signal based at least on a combination of the RI-MPR, A-MPR, and MPR values. In other words, the UE may adjust the transmit power of the signal based at least on the Total MPR value.

At block 330, the UE may transmit the signal using the adjusted transmit power. In an example implementation, the UE may transmit the signal from the UE using the adjusted power which may include reducing/increasing (e.g., positive or negative value) the transmit power of the signal by at least the RI-MPR value. In an additional example implementation, the UE may transmit the signal from the UE using the adjusted power which may include reducing the transmit power of the signal by at least the Total MPR value.

Figure 4:
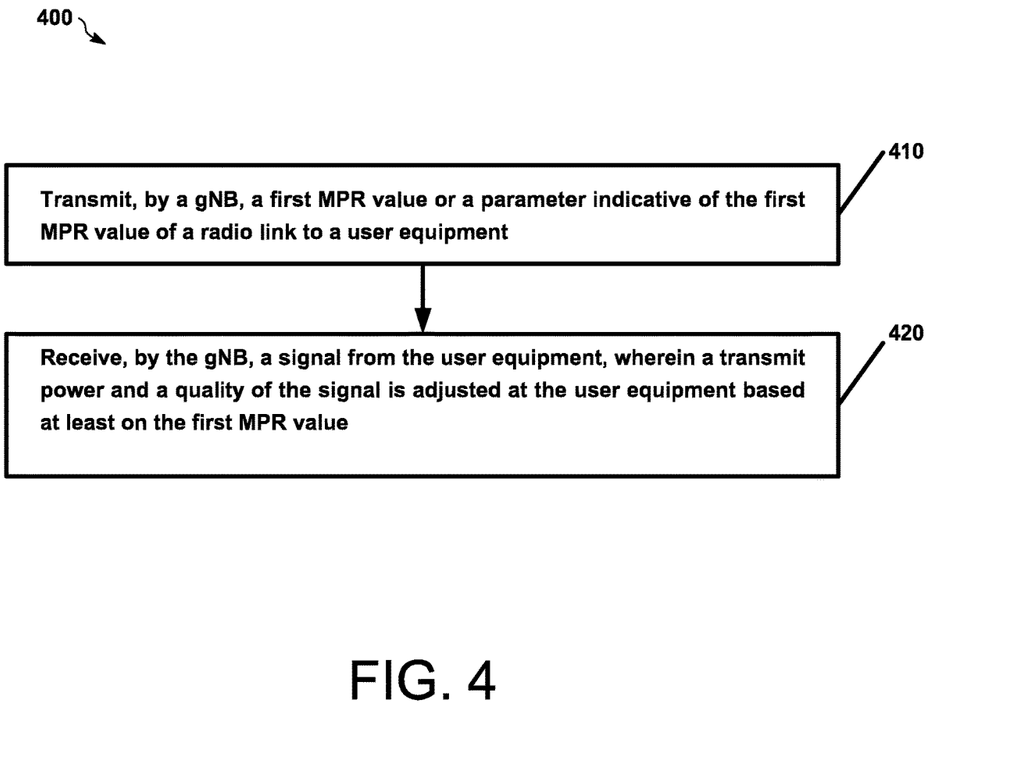
FIG. 4 is a flow chart illustrating adjusting maximum power reduction (MPR) values based on transmitter and receiver impairments, according to an additional example implementation.

In an example implementation, for OFDM, subcarrier spacing may considers as a criterion for determining the RI-MPR, and the RI-MPR values may be as shown below:
SCS 960 kHz (small/no influence): RI-MPR=0.0 dB
SCS 480 kHz (medium influence): RI-MPR=0.5 dB
SCS 240 kHz (a high influence): RI-MPR=1.0 dB The adjustments to the transmit power by taking transmitter and receiver impairments into consideration and further based on subcarrier spacing may maximize the link budget and may provide optimized performance when operating with multiple numerologies and different RF impairment conditions FIG. 4 is a flow chart 400 illustrating adjusting maximum power reduction (MPR) values based on transmitter and receiver impairments, according to an additional example implementation.

At block 410, in an example implementation, a gNB, e.g., gNB 204, may transmit a first MPR value or a parameter indicative of the first MPR value of a radio link to a user equipment. In an example implementation, the gNB may transmit the first MPR value (e.g., RI-MPR) value to the UE. In an additional example implementation, the gNB may transmit a parameter to the UE from which the UE may derive the RI-MPR value.

At block 520, the gNB may receive a signal from the user equipment. In some implementations, for example, the transmit power and a quality of the signal may have been adjusted at the user equipment based at least on the first MPR value transmitted from the gNB or based on the first MPR value determined at the UE based at least on the parameter transmitted from the gNB.

The adjustments to the transmit power of the signal transmitted by the user equipment after taking into consideration both transmitter and receiver impairments may provide optimized performance when operating with multiple numerologies and different RF impairment conditions.

FIG. 5A illustrates link-level performance 500 of OFDM when both phase noise and different power back-off values are included for 64-QAM, according to an additional example implementation.

In an example implementation, FIG. 5A illustrates the required signal-to-noise-ratio (SNR) without the phase noise (e.g., only PA non-linearity included) and with phase noise (e.g., both phase noise and PA non-linearity are included). If only PA non-linearity is considered, a 5 dB back-off may give the best performance for both subcarrier spacings (e.g., SCSs 960 kHz and 480 kHz), as shown at 510. However, for the 5 dB backoff with both phase noise and PA non-linearity, the performance degradation may be significantly higher for SCS 480 kHz than with SCS 960 kHz, as shown at 520. Although, 5 dB BO may be good enough for 960 kHz, higher BO, e.g., 6 or 7 dB may be needed for SCS 480 kHz to achieve better performance. This shows that in order to maximize the link budget, the maximum power reduction value should be defined based on subcarrier spacing, as described in this disclosure.

FIG. 5B illustrates link-level performance 550 of OFDM when both phase noise and different power back-off values are included for 16-QAM, according to an example implementation.

In an example implementation, FIG. 5B illustrates the required SNR with phase noise and PA non-linearity. If both phase noise and PA non-linearity are considered, SCS 120 kHz may require more BO (e.g., BO of 3 dB) than SCS 960 kHz (e.g., BO of 2 dB), as shown at 560 and 570, to achieve better performance. This shows that in order to maximize the link budget, the maximum power reduction value should be defined based on subcarrier spacing.

From FIGS. 5A and 5B, it can be shown that link budget may be maximized if the Total MPR is increased for smaller subcarrier spacings. In some implementations, this may be because smaller SCSs may be more sensitive to phase noise and thus in combination with PA non-linearity requires more MPR and increasing the Total MPR leaves more margin for phase noise in the receiver as the transmitted signal is cleaner due to higher MPR.

In an example implementation, for CP-OFDM, 16QAM, 480 MHz case, the MPR as defined in Table 6.2.2.3-2 in 3GPP TS 38.101-2 is 6.5 dB. In an example implementation, assuming RI-MPR values are defined as shown below:
SCS 960 kHz: RI-MPR=0.0 dB,
SCS 480 kHz: RI-MPR=0.5 dB, and
SCS 240 kHz: RI-MPR=1.0 dB,
the Total MPR may be achieved by combining MPR with RI-MPR:
SCS 960 kHz: Total-MPR=6.5 dB
SCS 480 kHz: Total-MPR=7.0 dB
SCS 240 kHz: Total-MPR=7.5 dB FIG. 6 illustrates link-level performance 600 for DFT-s-OFDM with phase noise and different power back-off values using 64-QAM, according to another additional example implementation.

In an example implementation, link budget may be maximized if the Total MPR is decreased for smaller subcarrier spacings which is opposite to the OFDM waveform (as illustrated in FIGS. 5A and 5B) because due to larger allocation with lower subcarrier spacings, DFT-s-OFDM may obtain averaging gain over the larger number of symbols and may also efficiently compensate phase noise also for smaller subcarrier spacings.

Additional example implementations are described herein.

Example 1. A method of communications, comprising: determining, by a user equipment, at least a first maximum power reduction (MPR) value for a radio link, the determining based at least on one or more receiver impairments associated with a receiver of the radio link; adjusting, by the user equipment, a transmit power and a quality of a signal being transmitted on the radio link based at least on the first MPR value; and transmitting, by the user equipment, the signal using the adjusted transmit power.

Example 2. The method of Example 1, wherein the adjusting further comprises adjusting the transmit power and the quality of the signal based at least on a combination of the first MPR value, a second MPR value, and/or a third MPR value.

Example 3. The method of any of Examples 1-2, wherein the first MPR value is a receiver impairment-MPR (RI-MPR) value, the second MPR value is an additional-MPR value (A-MPR), and/or the third MPR is an MPR value.

Example 4. The method of any of Examples 1-3, wherein the RI-MPR value is pre-defined at the user equipment.

Example 5. The method of any of Examples 1-3, further comprising: receiving the RI-MPR value from a gNB via higher layer signaling.

Example 6. The method of any of Examples 1-3, further comprising: receiving a parameter indicative of the RI-MPR value via higher layer signaling; and determining the RI-MPR value based at least on the parameter.

Example 7. The method of any of Examples 1-3, further comprising: determining the RI-MPR value based on a signal or a signal combination to be transmitted.

Example 8. The method of Examples 6 or 7, further comprising: determining the RI-MPR value based at least on a predefined table captured in the specification.

Example 9. The method of any of Examples 1-8, wherein the receiver impairments comprise one or more of: phase noise conditions at the receiver; phase noise mitigation conditions at the receiver; carrier frequency offset conditions at the receiver; inter-carrier interference conditions at the receiver; timing error conditions at the receiver; and channel estimation conditions at the receiver.

Example 10. The method of any of Examples 1-9, wherein the RI-MPR value for the radio link is determined based on one or more of: a subcarrier spacing configuration; an allocation bandwidth; and a waveform.

Example 11. The method of any of Examples 1-10, where the waveform is a cyclic prefix-orthogonal frequency division multiplexing (CP-OFDM) waveform or a discrete Fourier transform-spread-OFDM (DFT-s-OFDM) waveform.

Example 12. The method of any of Examples 1-11, wherein the RI-MPR value comprises positive or negative values for the CP-OFDM and/or DFT-s-OFDM waveforms.

Example 13. The method of any of Examples 1-12, wherein the RI-MPR value comprises at least: a first RI-MPR value for small/no influence scenario; or a second RI-MPR value for high influence scenario.

Example 14. A method of communications, comprising: transmitting, by a gNB, a first MPR value or a parameter indicative of the first MPR value of a radio link to a user equipment; and receiving, by the gNB, a signal from the user equipment, wherein a transmit power and a quality of the signal is adjusted at the user equipment based at least on the first MPR value.

Example 15. The method of Example 14, wherein the first MPR value is a receiver impairment-MPR (RI-MPR) value.

Example 16. The method of any of Examples 14-15, wherein the first MPR value or the parameter indicative is pre-defined at the gNB.

Example 17. The method of any of Examples 14-16, wherein the first MPR value or the parameter indicative of the first MPR value is transmitted to the UE via higher layer signaling.

Example 18. An apparatus comprising means for performing the method of any of Examples 1-17.

Example 19. A non-transitory computer-readable storage medium comprising instructions stored thereon that, when executed by at least one processor, are configured to cause a computing system to perform the method of any of Examples 1-17.

Example 20. An apparatus comprising: at least one processor; and at least one memory including computer program code, the at least one memory and the computer program code configured to, with the at least one processor, cause the apparatus at least to perform the method of any of Examples 1-17.

Example 21. An apparatus comprising: at least one processor; and at least one memory including computer program code; the at least one memory and the computer program code configured to, with the at least one processor, cause the apparatus to: determine, by a user equipment, at least a first maximum power reduction (MPR) value for a radio link, the determining based at least on one or more receiver impairments associated with a receiver of the radio link; adjust, by the user equipment, a transmit power and a quality of a signal being transmitted on the radio link based at least on the first MPR value; and transmit, by the user equipment, the signal using the adjusted transmit power.

Example 22. An apparatus comprising: at least one processor; and at least one memory including computer program code; the at least one memory and the computer program code configured to, with the at least one processor, cause the apparatus to: transmit, by a gNB, a first MPR value or a parameter indicative of the first MPR value of a radio link to a user equipment; and receive, by the gNB, a signal from the user equipment, wherein a transmit power and a quality of the signal is adjusted at the user equipment based at least on the first MPR value.

Figure 7:
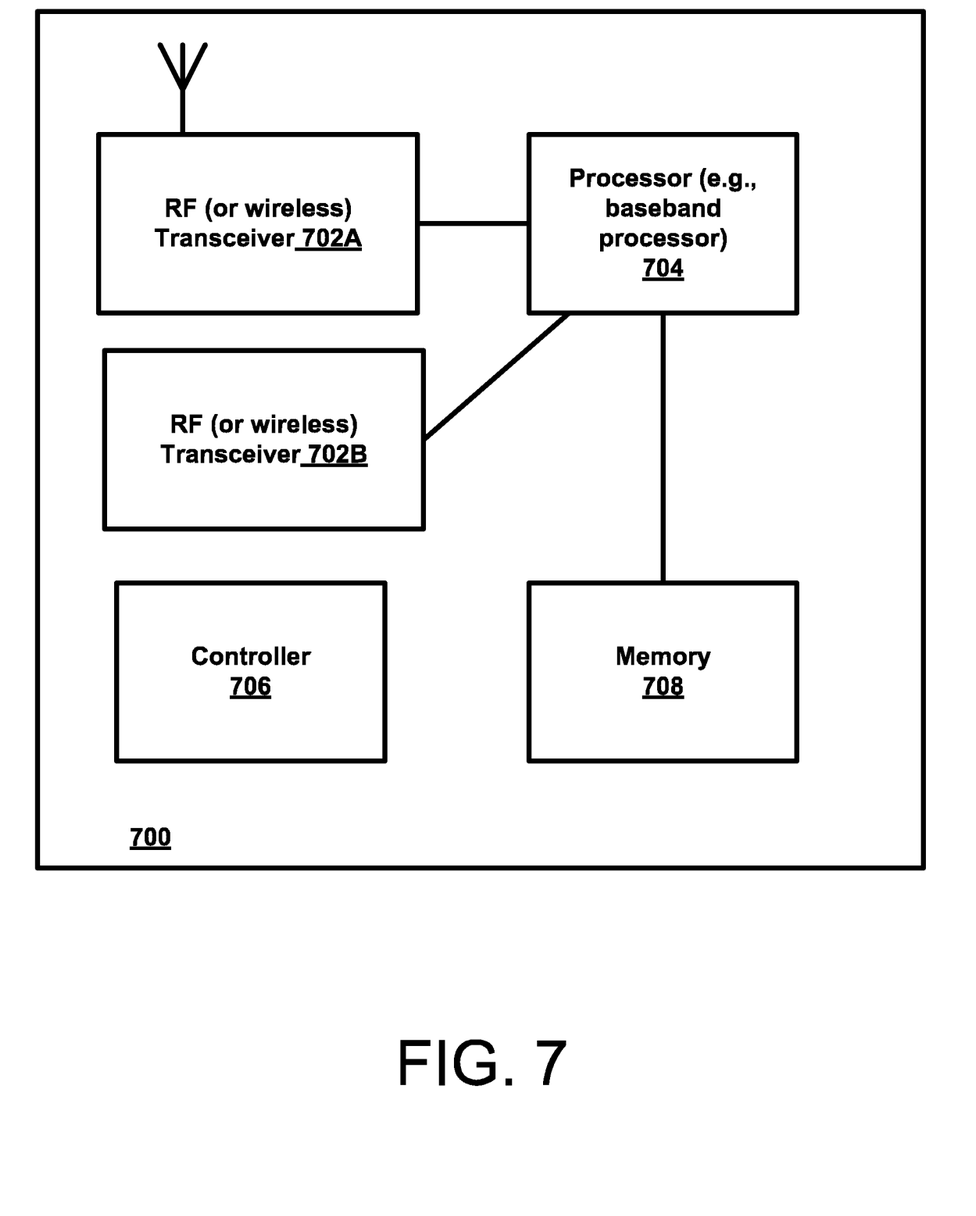
FIG. 7 is a block diagram of a node or wireless station (e.g., base station/access point or mobile station/user device/UE), according to an example implementation.

FIG. 7 is a block diagram of a wireless station (e.g., user equipment (UE)/user device or AP/gNB/MgNB/SgNB) 700 according to an example implementation. The wireless station 700 may include, for example, one or more RF (radio frequency) or wireless transceivers 702A, 702B, where each wireless transceiver includes a transmitter to transmit signals and a receiver to receive signals. The wireless station also includes a processor or control unit/entity (controller) 704/706 to execute instructions or software and control transmission and receptions of signals, and a memory 708 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller 706 (or processor 704) may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software. Moreover, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method of communication, comprising:
   determining, by a user equipment, a total maximum power reduction (MPR) value for a radio link to communicate with a gNB, wherein the total MPR value includes a first MPR value, a second MPR value, and a third MPR value, wherein the first MPR value is a receiver impairment-MPR (RI-MPR) value comprising a first RI-MPR value for small and no influence scenario and a second RI-MPR value for high influence scenario, the second MPR value is an additional-MPR value (A-MPR), and the third MPR is an MPR value, wherein the RI-MPR value represents receiver impairments associated with a receiver of the radio link for uplink transmission, and wherein the receiver impairments comprise:
  phase noise conditions at the receiver,
  phase noise mitigation conditions at the receiver,
  carrier frequency offset conditions at the receiver,
  inter-carrier interference conditions at the receiver,
  timing error conditions at the receiver, and
  channel estimation conditions at the receiver,
wherein the RI-MPR value for the radio link is determined based on:
  a subcarrier spacing configuration,
  an allocation bandwidth, and
  a waveform, and
wherein the A-MPR value is determined based on a characteristic of a transmission signal;
adjusting, by the user equipment, a transmit power and a quality of the transmission signal based at least on the total MPR value; and
transmitting, by the user equipment, the transmission signal based on the adjusted transmit power and the quality of the transmission signal.

2. The method of claim 1, wherein the adjusting further comprises adjusting the transmit power and the quality of the transmission signal based at least on the total MPR value.

3. The method of claim 2, wherein the RI-MPR value is defined at the user equipment.

4. The method of claim 3, further comprising:
receiving the RI-MPR value from the gNB via higher layer signaling.

5. The method of claim 4, further comprising:
receiving a parameter indicative of the RI-MPR value via higher layer signaling; and
determining the RI-MPR value further based at least on the received parameter.

6. The method of claim 5, further comprising:
determining the RI-MPR value further based on the transmission signal.

7. The method of claim 6, further comprising:
determining the RI-MPR value further based at least on a predefined table captured in 3GPP specification.

8. The method of claim 7, where the waveform is a cyclic prefix-orthogonal frequency division multiplexing (CP-OFDM) waveform or a discrete Fourier transform-spread-OFDM (DFT-s-OFDM) waveform.

9. The method of claim 8, wherein the RI-MPR value comprises a positive value or a negative value for the CP-OFDM waveform and/or the DFT-s-OFDM waveform.

10. A method of communication, comprising:
transmitting, by a gNB, a total maximum power reduction MPR value of a radio link to a user equipment, wherein the total MPR value includes a first MPR value, a second MPR value, and a third MPR value, wherein the first MPR value is a receiver impairment-MPR (RI-MPR) value comprising a first RI-MPR value for small and no influence scenario and a second RI-MPR value for high influence scenario, the second MPR value is an additional-MPR value (A-MPR), and the third MPR is an MPR value, wherein the RI-MPR value represents receiver impairments associated with a receiver of the radio link for uplink transmission,
wherein the receiver impairments comprise:
  phase noise conditions at the receiver,
  phase noise mitigation conditions at the receiver,
  carrier frequency offset conditions at the receiver,
  inter-carrier interference conditions at the receiver,
  timing error conditions at the receiver, and
  channel estimation conditions at the receiver,
wherein the RI-MPR value for the radio link is determined based on:
  a subcarrier spacing configuration,
  an allocation bandwidth, and
  a waveform, and
wherein the A-MPR value is determined based on a characteristic of a transmission signal; and
receiving, by the gNB, a signal from the user equipment, wherein a transmit power and a quality of the signal are adjusted at the user equipment based at least on the total MPR value.

11. The method of claim 10, wherein the first MPR value is defined at the gNB.

12. The method of claim 10, wherein the first MPR value is transmitted to the user equipment via higher layer signaling.

13. An apparatus, comprising:
at least one processor; and
at least one memory including computer program code;
the at least one memory and the computer program code configured to, with the at least one processor, cause the apparatus to:
determine, by a user equipment, at least a total (MPR) value for a radio link to communicate with gNB, wherein the total MPR value includes a first MPR value, a second MPR value, and a third MPR value, wherein the first MPR value is a receiver impairment-MPR (RI-MPR) value comprising a first RI-MPR value for small and no influence scenario and a second RI-MPR value for high influence scenario, the second MPR value is an additional-MPR value (A-MPR), and the third MPR is an MPR value, wherein RI-MPR represents receiver impairments associated with a receiver of the radio link for uplink transmission,
wherein the receiver impairments comprise:
  phase noise conditions at the receiver,
  phase noise mitigation conditions at the receiver,
  carrier frequency offset conditions at the receiver,
  inter-carrier interference conditions at the receiver,
  timing error conditions at the receiver, and
  channel estimation conditions at the receiver,
wherein the RI-MPR value for the radio link is determined based on:
  a subcarrier spacing configuration,
  an allocation bandwidth, and
  a waveform, and
wherein the A-MPR value is determined based on a characteristic of a transmission signal;
adjust, by the user equipment, a transmit power and a quality of the transmission signal based at least on the total MPR value; and
transmit, by the user equipment, the transmission using-based on the adjusted transmit power and the quality of the transmission signal.

14. An apparatus, comprising:
at least one processor; and
at least one memory including computer program code;
the at least one memory and the computer program code configured to, with the at least one processor, cause the apparatus to:

transmit, by a gNB, a total maximum power reduction MPR value of a radio link to a user equipment, wherein the total MPR value includes a first MPR value, a second MPR value, and a third MPR value, wherein the first MPR value is a receiver impairment-MPR (RI-MPR) value comprising a first RI-MPR value for small and no influence scenario and a second RI-MPR value for high influence scenario, the second MPR value is an additional-MPR value (A-MPR), and the third MPR is an MPR value, wherein the RI-MPR value represents receiver impairments associated with a receiver of the radio link for uplink transmission, wherein the receiver impairments comprise:
phase noise conditions at the receiver,
phase noise mitigation conditions at the receiver,
carrier frequency offset conditions at the receiver,
inter-carrier interference conditions at the receiver,
timing error conditions at the receiver, and
channel estimation conditions at the receiver, wherein the RI-MPR value for the radio link is determined based on:
a subcarrier spacing configuration,
an allocation bandwidth, and
a waveform, and wherein the A-MPR value is determined based on a characteristic of a transmission signal; and receive, by the gNB, a signal from the user equipment, wherein a transmit power and a quality of the signal are adjusted at the user equipment based at least on the total MPR value.

* * * * *